United States Patent [19]
Minovitch

[11] 3,825,211
[45] July 23, 1974

[54] LASER ROCKET

[75] Inventor: Michael A. Minovitch, Los Angeles, Calif.

[73] Assignee: Phaser Telepropulsion, Inc., Los Angeles, Calif.

[22] Filed: June 19, 1972

[21] Appl. No.: 263,987

[52] U.S. Cl.................. 244/1 SB, 60/203, 244/62, 331/94.5 A
[51] Int. Cl............................................. B64g 1/00
[58] Field of Search......... 244/1 SB, 1 SS, 62, 73 R; 60/202, 203, 204; 331/94.5 A

[56] References Cited
UNITED STATES PATENTS

| | | | |
|---|---|---|---|
| 3,114,517 | 12/1963 | Brown............................. | 244/1 SB |
| 3,392,527 | 7/1968 | Gilmour et al.................... | 60/204 X |
| 3,495,406 | 2/1970 | Donatelli et al. ......... | 331/94.5 A X |

OTHER PUBLICATIONS

Kantrowitz, Arthur, "Propulsion to Orbit by Ground-Based Lasers," Astronautics & Aeronautics, May, 1972, pp. 74–76.

Primary Examiner—Duane A. Reger
Assistant Examiner—Barry L. Kelmachter
Attorney, Agent, or Firm—Christie, Parker & Hale

[57] ABSTRACT

This space vehicle carries a vaporizable propellant and energy is transmitted to the vehicle while in space by a laser beam originating on the ground or some other body or satellite. The space vehicle has replaceable propellant tanks and propellant flow from them through a transparent tube on the focal axis of a parabolic cylindrical reflector. A high energy laser beam concentrated by the reflector heats the propellant which then travels through a swivel to a rocket nozzle aligned with the vehicle center of mass. The reflector and tube form an energy gathering assembly that is mounted for pivoting about an axis transverse to the vehicle axis for maintaining alignment with a remote laser station. Several incremental operations of the laser rocket can sequentially boost it to more energetic orbits and eventually to escape velocities. Such a vehicle can be conveniently used as a "tug" for other space vehicles.

13 Claims, 6 Drawing Figures

PATENTED JUL 23 1974

LASER ROCKET

BACKGROUND

At present when it is desired to accelerate a space vehicle chemical propulsion techniques are used. Mixtures of reactive liquids or gases are ignited to release chemical energy and yield high temperature, high velocity exhaust gases for vehicle propulsion. Such fuels are major portions of the vehicle's weight and the load is commensurately small. Rocket technology has about reached the limit of available chemical energy and advanced concept emphasis has shifted to nuclear propulsion.

In nuclear propulsion a reactor is carried on the space vehicle and a propellant gas is passed through the reactor to raise it to elevated temperatures. Very large amounts of energy can be expended for propulsion by such nuclear rockets. Such nuclear devices are, however, not free of problems. They are still heavy structures in the sizes required for advanced space vehicles and radiation shielding further contributes to the high weight. Such radiation shielding is required for guidance, navigation and communication equipment, which is susceptible to damage by unclear radiation. Such nuclear rockets are expensive and according to the present techniques for space vehicle utilization are expendable and usable only for single missions.

It is desirable to provide a space vehicle which can be powered by an energy source which remains on the ground or in a position where it can otherwise be reused rather than lost. This permits the energy source to be used for many missions and can effect a very substantial economy. By basing the energy source on the ground, the mass injected into orbit can also be reduced.

Techniques have been suggested for transmitting power to orbiting space vehicles by way of microwaves generated on the earth's surface. This power could then be converted into electric energy and used to augment power from the vehicle storage batteries and solar cells. The wavelength of such a beam is relatively long and beam divergence is necessarily high, thereby limiting the distance practical energy levels can be transmitted.

It has also been proposed that laser beams can be directed to a solar electric rocket vehicle to illuminate the solar panels and increase their performance. Such electric power could be useful in an electric discharge engine. It has also been suggested that the first stage booster performance of large launch vehicles can be enhanced by focusing a powerful laser beam on the inside walls of the rocket nozzles. The resulting ablation would increase total thrust. All of these techniques are limited to augmenting more conventional space vehicle propulsion techniques.

It is desirable to provide a technique wherein a laser beam can be employed for substantially all of the propulsion requirements on a space vehicle. Preferably such a vehicle directly converts the energy in a high powered laser beam into propellant thermal energy.

BRIEF SUMMARY OF THE INVENTION

Thus in practice of this invention according to a presently preferred embodiment there is provided a space vehicle having tanks for a vaporizable propellant and a rocket nozzle substantially in line with the vehicle center of mass. An energy gathering assembly is mounted for pivoting about an axis transverse to the vehicle axis. The energy gathering assembly comprises a parabolic cylinder radiation reflector having a radiation absorption conduit extending along its focal axis. Propellant from the tanks is passed through the absorption conduit and through a swivel to the nozzle. The pivotable reflector permits utilization of a laser beam from a remote station over a wide range of vehicle attitudes.

DRAWINGS

These and other features and advantages of the present invention will be appreciated as the same becomes understood by reference to the following detailed description of a presently preferred embodiment when considered in connection with the accompanying drawings wherein.

DESCRIPTION

Figures 1, 2:
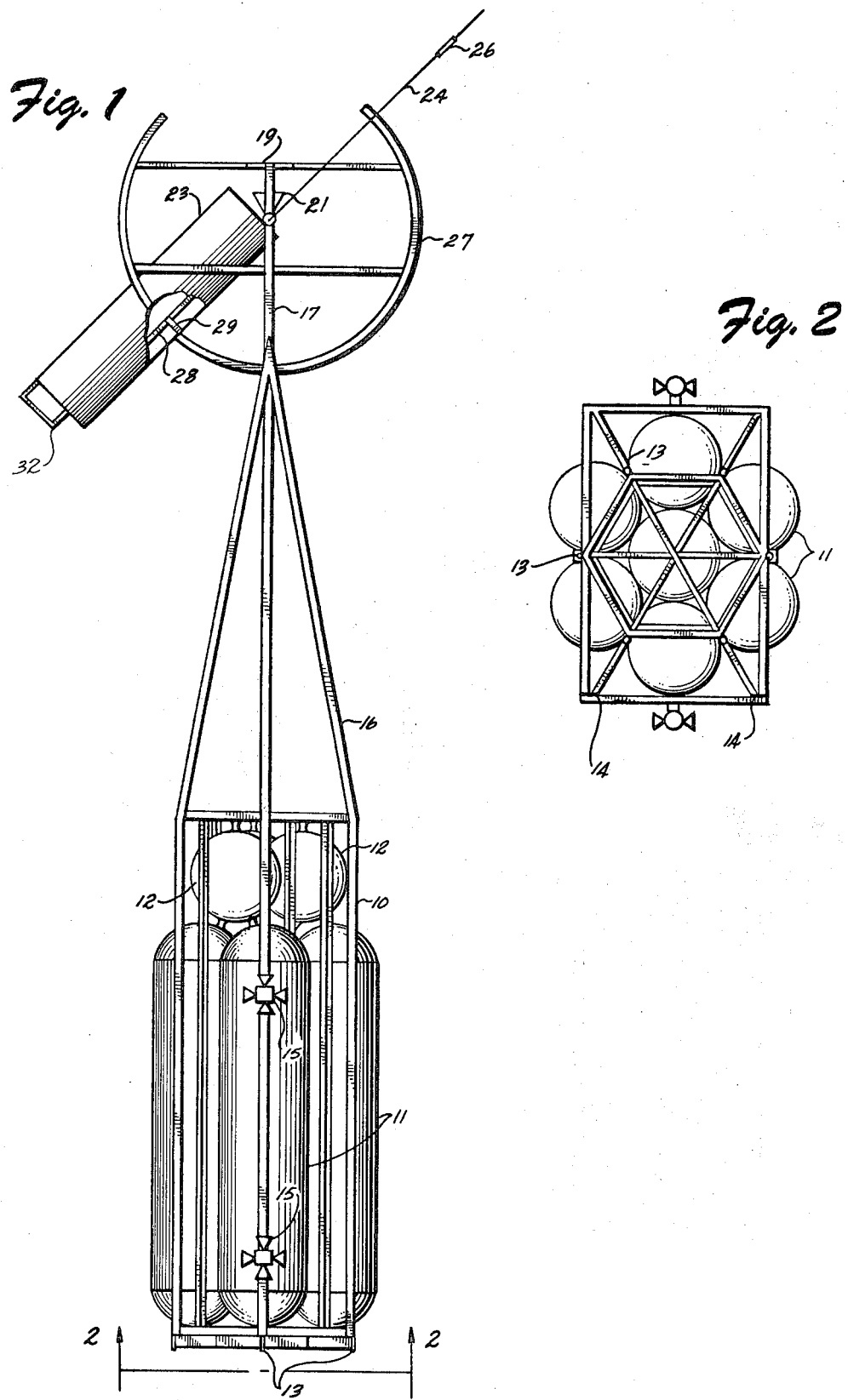
FIG. 1 illustrates in side view a laser rocket space vehicle constructed according to principles of this invention.
FIG. 2 is a front view of the vehicle of FIG. 1.
Figure 3:
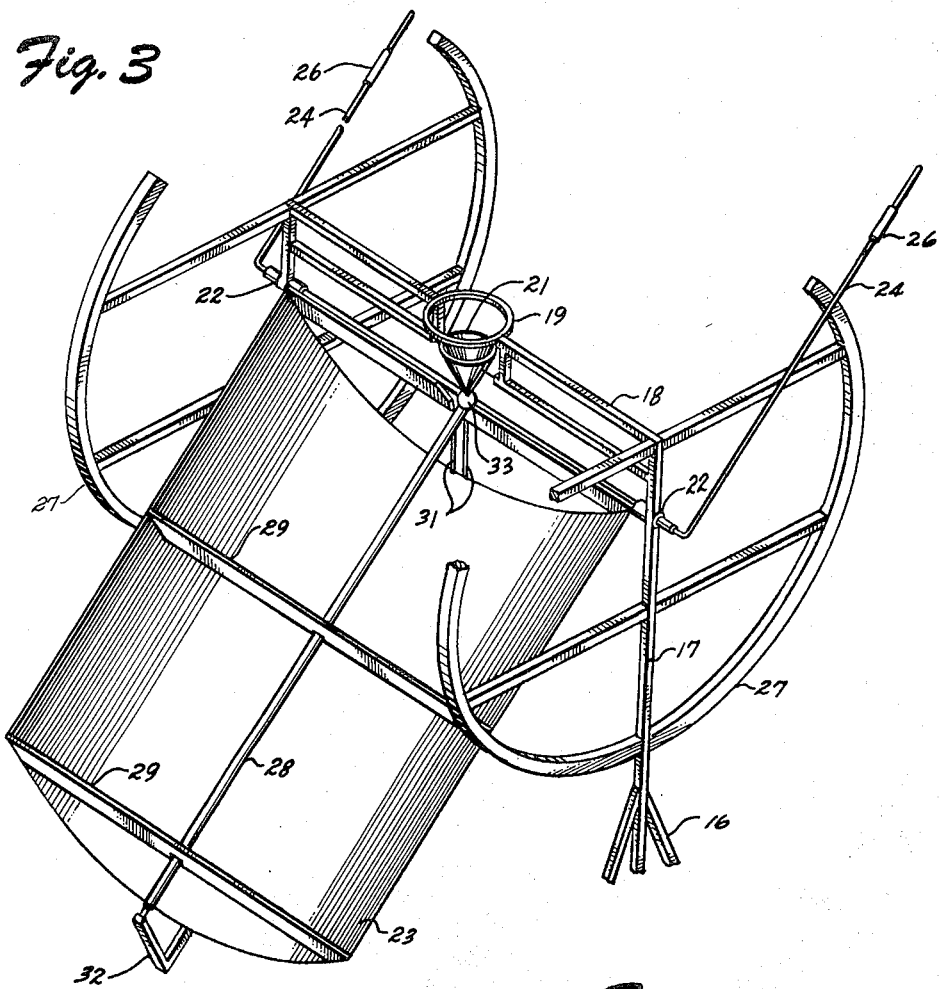
FIG. 3 is a partial perspective of the energy gathering portion of the vehicle.

FIGS. 1 to 3 illustrate the structural arrangement of a presently preferred embodiment of laser rocket constructed according to principles of this invention. This space vehicle is preferably made in the form of a light weight tubular metal frame 10 for maximum strength and minimum weight. At the forward end of the frame is a rectangular cage within which are positioned seven propellant tanks 11 arranged in a hexagon for maximum packing density. A vaporizable propellant such as liquid hydrogen is stored in the tanks for operation of the space vehicle. Also mounted within the cage are three instrument spheres 12, two of which contain electronic equipment, propellant, and the like for attitude control guidance, navigation, communication, data sensing and reduction, and the like, as required for operation of the space vehicle. The third sphere is used for propellant seeding material used to increase the propellant's ability to absorb the laser beam as hereinafter described. Typically the vehicle is radio controlled and unmanned. Guidance and navigation can also be provided from a payload vehicle. Preferably, the frame 10, propellant tanks 11 and instrument systems 12 are arranged so that the center of mass of the vehicle is along the vehicle axis at all times as propellant is expended.

At the forward end of the vehicle there are a plurality of docking latches 13 shown only schematically in the drawings. The docking latches are used during operation of the vehicle for coupling it to another space vehicle which can be considered the payload for this vehicle. In this way the thrust generated by the laser rocket can be transmitted to the other space vehicle and the laser rocket can be used as a "space tug" for boosting the other vehicle into a different trajectory and then separating so that the two vehicles subsequently follow different trajectories.

Hinges 14 may be provided on the forward thrust structure of the space vehicle so that a portion of the structural frame can be folded out of the way to permit access to the propellant tanks 11. In this way the tanks can be removed from the vehicle and replaced in orbit by a space shuttle, thereby loading propellant in the vehicle. If desired in lieu of replacing entire tanks in cartridge fashion, fluid coupling can be connected and propellant transferred from a shuttle vehicle to the propellant tanks on the laser rocket. If desired access to the peripheral propellant tanks 11 can be had from the sides of the vehicle and the central propellant tank can be removed through the forward end or permanently left in place. Similarly the instrument and seeding spheres 12 may be removed from the sides of the space frame and replaced as may be required for periodic maintenance and refueling.

Conventional vernier rockets 15 are mounted on the frame for controlling roll, pitch and yaw of the vehicle during space flight.

A triangular truss structure 16 extends aft from the rectangular frame. At the aft end of th vehicle the truss reduces to a pair of parallel struts 17 extending parallel to the vehicle axis. A rigid frame 18 interconnects the struts 17 at the aft end of the vehicle. The rigid frame includes a ring 19 for providing transverse strength near the exit end of a conventional rocket nozzle 21. The rocket nozzle is merely shown schematically as a cone in the drawings and the details thereof for optimum propulsion efficiency are not important for practice of this invention. The frame, propellant tanks and other structural elements of the vehicle are made highly reflective for rejecting as much accidental incident radiation as possible.

Pivots 22 are provided at the base of the rigid frame 18 and support an energy gathering assembly. The axis of the pivots 22 is transverse to the vehicle axis so that the entire energy gathering assembly can be tilted. A principal component of the energy gathering assembly is a high efficiency radiation reflector 23 in the form of a parabolic cylinder. Counter balancing rods 24 with adjustable balance weights 26 are fixed to the energy gathering assembly. As the energy gathering assembly is tilted this permits its center of mass to remain substantially on a line between the nozzle 21 and the center of mass of the vehicle.

A pair of arcuate tracks 27 are mounted on the struts 17 and serve to guide and support the side edges of the reflector 23 as it is pivoted further assuring its strength and rigidity. A radiation absorption conduit 28 extends along the focal axis of the parabolic cylinder radiation reflector 23. The absorption conduit 28 is carried by transverse braces 29 which also rigidify the reflector 23.

Propellant from the tanks 11 passes through conduits (not shown) along the struts 17 to the energy gathering assembly. Conventional flexible or pivot fluid couplings carry the propellant to the pivotable energy gathering assembly where it passes through along the rear of the reflector 23. If desired the propellant may be distributed through cooling tubes in thermal contact with the reflector for cooling it and adding energy to the propellant. Whether or not used in this manner the propellant is passed around the outer end of the reflector by a bundle of conduits 32 and injected into the radiation absorption conduit 28. Propellant passing through this conduit is heated as hereinafter described and passes through a swivel 33 into the input end of the rocket nozzle 21.

Figure 4:
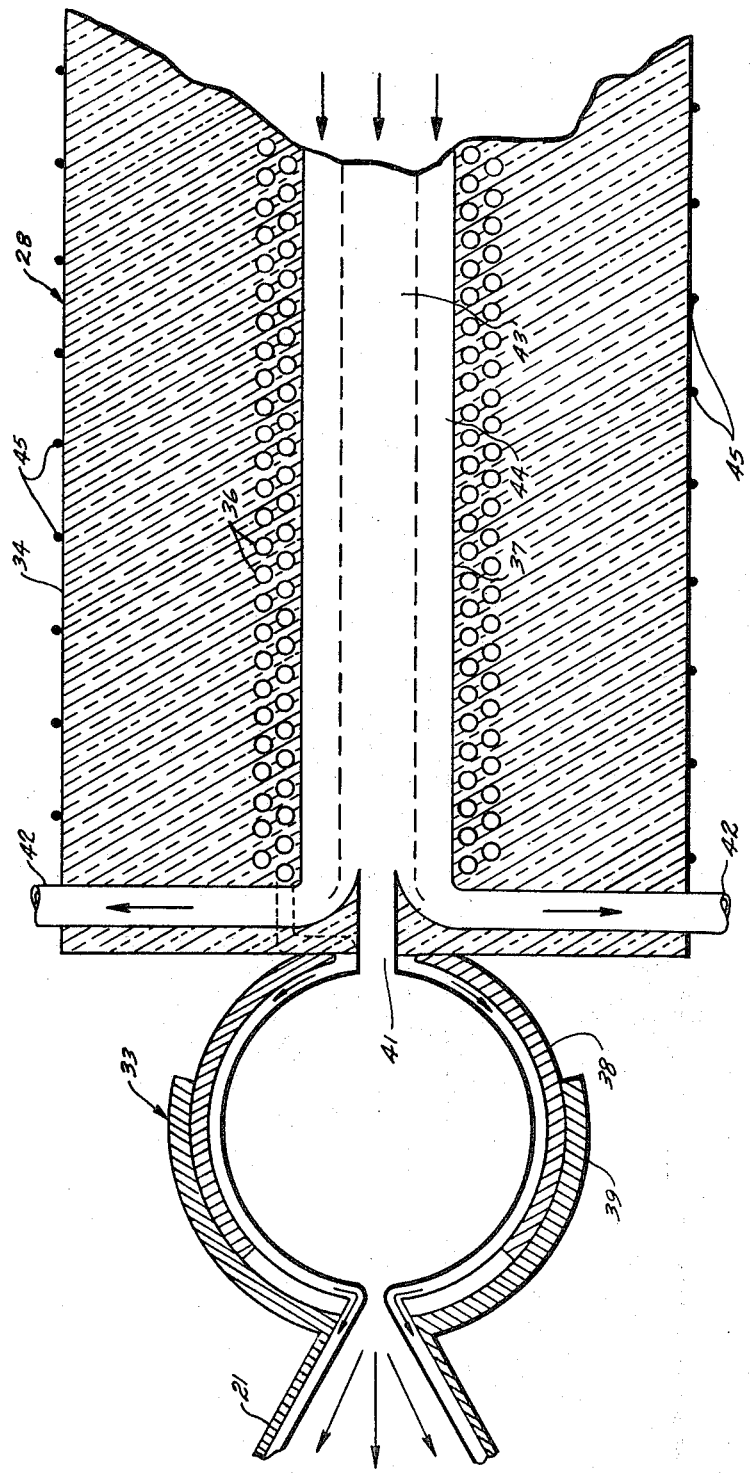
FIG. 4 is a fragmentary cross section of the energy absorption conduit of the vehicle.

FIG. 4 illustrates in longitudinal semi-schematic cross section the output end of the radiation absorption conduit 28. The radiation absorption conduit comprises a hollow quartz tube 34 or the like which is transparent to radiation in a selected wave length range. Cooling channels 36 are provided in the quartz tube adjacent the axial passage 37 therethrough. Clear, unseeded propellant is passed through the cooling passages 36 and through the interior of the swivel mechanism 33 and nozzle 21 for cooling the surfaces thereof and thereby protecting the structures from the high temperature gas involved in operation of the laser rocket. It will be apparent that the swivel mechanism 33 is shown only schematically in FIG. 4, and generally comprises an inner swivel portion 38 connected to the conduit and an outer portion 39 connected to the nozzle 21. A passage 41 receives gas from a central portion of the bore 37 through the conduit for passage into the swivel chamber. Clear, unseeded propellant near the boundaries of the bore 37 through the radiation absorption conduit is collected and after seeding passes laterally through tubes 42 for recirculation through the tubes 31 (FIG. 3) back to the inlet end of the radiation absorption conduit.

Radiation such as from a ground based laser impinges on the radiation reflector 23 and is concentrated onto the focal axis where the radiation absorption conduit is located. The quartz tube 34 is transparent to the radiation which thus enters the bore 37. The propellant gas, typically hydrogen, is also transparent to the radiation and there is therefore very little radiation absorption in the quartz tube or the cooling channels 36. Nitrogen or other propellants may be used as desired. In order to make the propellant passing through the bore 37 absorbent for the incident radiation, the propellant is seeded with sub-micron size particles of tungsten or other refractory material. The particle size of the seeding material is selected for optimum energy absorption at the wave length of interest with minimum back scattering. If desired, the inside wall of the tube may be partially reflectorized for minimizing such energy losses. In particular the side of the conduit remote from the radiation reflector can be silvered for redirecting any radiant energy back to the seeded hydrogen passing through the bore.

Preferably in order to maintain the walls of the radiation absorption conduit relatively cool, the central portion 43, as indicated by the dash lines in FIG. 4 of the propellant stream is seeded with the refractory particles. A boundary layer 44 of unseeded propellant is injected nearer the walls of the bore 37 for minimizing convective heat transfer from the heated propellant to the conduit wall.

As the seeded propellant in the center region 43 passes along the focal axis of the radiation reflector it absorbs radiation and becomes increasingly energetic. A portion of the seeded propellant so heated passes through the central passage 41 into the swivel chamber and is discharged through the nozzle 21 for propelling the vehicle. The boundary layer propellant and a portion of the seeded propellant is diverted through the tubes 42 and recirculated into the input end of the radiation absorption conduit. Additional seeding with refractory particles occurs before the propellant is reinjected into the conduit. Thus, on the average, propellant flows twice through the absorption conduit, once as a portion of the boundary layer for protecting the wall of the conduit and a second time as a portion of the seeded gas stream passing through the center of the bore. Clearly some mixing between these two portions will occur and the recirculating gas will carry considerable energy with it. Some of the propellant will also be preheated by flow through the cooling channels 36 and such other cooling structures as may be employed in the space vehicle.

In lieu of seeding the propellant with refractory particles a minor portion of a second gas may be added to the central stream of propellant passing through the radiation absorption conduit. This secondary gas is selected for resonant energy absorption at the wave length of the incident radiation.

Since the propellant in the center region 43 of the bore is at an elevated temperature, much of it will be ionized as it flows along the length of the energy absorption conduit. A wire or wires 45 are wound around the outside of the absorption tube and conduct an electric current. The resultant magnetic field tends to constrict the flow of ionized gas to the central portion of the bore through the conduit, this pinching of the heated gas increases as flow velocities and temperatures increase towards the rocket nozzle. The magnetic field thus becomes more effective for inhibiting heating of the tube walls where the gas is hottest and directs it to the central region where it can pass into the nozzle.

At present lasers with sufficient energy for operation of a large scale laser rocket have not been built. The design of such a laser generating station has, however, been described by A Hertzberg, E. Johnston and H. Ahlstrom in A.I.A.A. Paper No. 71-106, Jan., 1971, entitled "Photon Generators and Engines for Laser Power Transmission" using closed loop gas dynamic laser technology. Radiation from such a gas dynamic laser generator station using carbon monoxide as the working fluid is coherent and can be focused in a narrow beam having relatively low divergence. By using an initial beam diameter of about five meters and a radiation reflector 23 about 20 meters square, high efficiency radiation absorption can be achieved to distances of at least 40,000 kilometers from the laser station. The beam can also be formed by a collection of lower power lasers operating in a phase array mode. The inherent redundancy is desirable for reliability.

Accurate tracking and pointing of the laser beam is needed as it is transmitted from a fixed ground station, for example, to a laser rocket space vehicle orbiting overhead. High pointing accuracy must also be maintained in the radiation reflector. The pointing accuracies are approximately those that are being satisfied by the various orbiting astronomical observatory space craft presently employed. Since reflective systems are involved, feedback arrangements can readily be provided for maintaining a high pointing accuracy.

Generally speaking operation of the laser rocket occurs only when it is within range of a laser station. Hence each orbit is selected so that it will periodically bring the space vehicle within range of a laser generating station. During the time that the space vehicle is within sight of the laser generating station, a beam of radiation is directed towards the vehicle and collected by it for propulsion. In most trajectories the angle between the desired direction of impulse of the laser rocket and the remote laser generating station will be constantly changing. It is for this reason that the energy gathering assembly on the space vehicle is pivoted.

Since the rocket nozzle 21 is aligned with the center of mass of the space vehicle the propulsive thrust vector will always be substantially along the axis. The small vernier rockets 15 are used to control the roll of the vehicle during a propulsion maneuver. Such roll of the vehicle keeps the pivot axis of the energy gathering assembly perpendicular to a line between the laser generating station and the laser rocket. Pivoting of the energy gathering assembly then keeps the axis of the energy absorption conduit (that is the focal axis of the parabolic cylindrical reflector) also perpendicular to the line between the laser generating station and the space vehicle. The laser beam thus properly strikes the radiation reflector and is concentrated on the focal axis for heating the seeded propellant passing through the bore of the radiation absorption conduit. This heated gas passes through the swivel and out of the rocket nozzle 21 for propelling the space vehicle. Because of the swivel the vehicle is propelled along its axis irrespective of orientation of the energy gathering assembly.

The angle through which the energy gathering assembly can be tilted is such that it can pick up a laser beam as it approaches a laser generating station, with the angle being limited only insofar as the beam may impinge on the frame or tankage structure of the space vehicle. Clearly by making the supporting struts between the tankage portion of the vehicle and the energy gathering assembly longer, the limiting angle can be decreased. As the vehicle recedes from the laser generating station the energy gathering assembly is pivoted around to continue to receive radiation and this angle, unless limited by the swivel mechanisms, can extend as far as desired with a practical limit being the pivoting required to receive a beam more than about 5° above the horizon at the laser generating station. Typically for an earth based laser station it is undesirable to direct the high intensity laser beam in a direction closer than about 5° from the local horizon since refraction and absorption effects in the atmosphere become significant.

Absorption of the high energy laser beam by the atmosphere is fairly nominal, however, water vapor and dust can cause attenuation. Similarly cloud cover over a laser generating station may temporarily bar use of the system. In order to minimize these attenuations and interruptions of operation, it is preferred that an earth based laser generating station be located in a region relatively free of clouds and at a relatively high altitude. One suitable site is on the east coast of Africa approximately on the equator. Review of the satellite photographs establishes that this locale has a minimum cloud cover for equatorial sites, being obscured only about 4 percent of the time. Low altitude water vapor and dust are little problem in this region also. Another suitable site is on the east coast of Baja, California at a latitude of about 28.5°.

As a matter of interest it will be noted that the laser generating station operates intermittently only during such periods as a laser rocket space vehicle is within sight of the station. During the balance of the time the laser generating station may be employed for generating electric power thereby vastly improving the economics of the system.

While it has been assumed herein for a preferred embodiment that the laser station is earth based, it will be apparent that it could be placed on the moon, another planet or a planetary moon. Similarly the laser station can be assembled in earth orbit. Solar or nuclear energy would be suitable for such a station.

Figure 5:
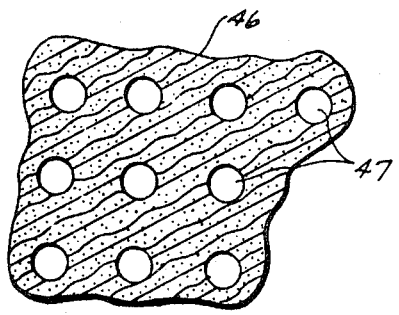
FIG. 5 is a fragmentary cross section of another embodiment of energy absorption conduit.

FIG. 5 illustrates in transverse cross section another embodiment of energy absorption conduit which may be used in lieu of the transparent tube illustrated in FIG. 4. According to this arrangement an opaque body 46 of refractory material such as graphite replaces the transparent tube. A number of passages 47 are provided through the graphite for conducting proellant. Radiation impinging on the opaque body is absorbed and conducted to the passages through which the propellant flows. This results in heating of the propellant which is utilized in substantially the same manner as hereinabove described. An opaque radiation absorption conduit has certain advantages since its external geometry can be varied to optimize the absorption of radiation from the parabolic reflector. An opaque absorber can be relatively insensitive to the wave length of the laser beam, which may be advantageous for optimum utilization of lasers whose energy is not absorbed with high efficiency by a seeded propellant. Such an absorber must operate below its melting temperature and therefore may be inferior to the transparent conduit.

Figure 6:
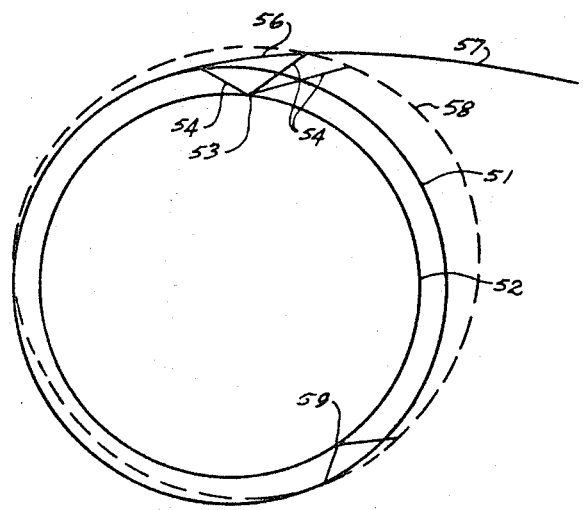
FIG. 6 illustrates one exemplary trajectory for a laser rocket.

FIG. 6 illustrates schematically an exemplary trajectory which might be followed by a laser rocket during space flight. The laser rocket is preferably assembled in earth orbit after boosting by conventional techniques. In this example the laser rocket and another space vehicle are temporarily latched together so that the laser rocket may serve as a space tug for boosting the second space vehicle as a payload, to a more energetic trajectory. These two vehicles travel together in a circular parking orbit 51 around the earth 52. When the vehicles come into sight of a laser station 53 on the earth's surface, a high energy laser beam 54 is directed to the laser rocket. The radiation heats the propellant and can be used to increase the vehicle velocity.

The energy thus added raises both vehicles along an enhanced trajectory 56. At some desired point the two vehicles are unlatched and the payload space vehicle is permitted to follow an escape trajectory 57. The laser rocket is turned around by its vernier rockets and the laser beam is used to decelerate the laser rocket and maintain it in an elliptical orbit 58, so that it is not lost from earth's gravitational field.

If desired a second laser station 59 can be used for further decelerating the laser rocket from its elliptical orbit to a lower earth orbit for refueling by a space shuttle. It will be recognized that the second laser station 59 is not necessary and a single laser station can be used for accelerating and decelerating the laser rocket. The second laser rocket station may not be a separate installation but may be the same installation moved to a new position relative to the vehicle orbit due to rotation of the earth after a suitable time interval.

It will also be apparent that the single stage boosting from a low energy earth parking orbit to escape velocity during one pass over an earth based laser station is merely one type of trajectory. A lower energy laser station or heavier space vehicle may employ a technique whereby an increment of energy is added to the laser rocket and payload during each of several passes over the laser station to gradually accumulate sufficient energy in the space vehicle to bring it to escape velocities. Thus, for example, a high mass payload may be "shoved" into successively higher energy parking orbits by a series of pushes from a laser rocket space tug. The laser rocket's engine is energized on a series of periapsis passages that are timed to occur when the laser rocket is in a favorable position relative to the laser generating station. A large payload may be assembled in a relatively low circular orbit and gradually raised to a high energy pre-injection parking orbit of high eccentricity.

The laser rocket may separate from the payload periodically to replenish its propellant supply. To do this the laser rocket is decelerated to a low circular orbit to rendezvous with a propellant depot or space shuttle and then the laser rocket rejoins the payload to continue the periodic acceleration process. In one exemplary space mission using a single 500 megawatt earth based laser station and which requires sending a 2,000,000 pound payload to Mars, according to such a technique, forty separate periapsis laser rocket "burns" can be achieved in approximately 60 days including the time required for the laser rocket "tug" to drop down to a low circular orbit for three refuelings. A total thrusting of about 14 hours can be achieved during that period. The final pre-injection orbit has apoapsis and periapsis distances of 350,000 km. and 20,000 km., respectively. If a scheduled laser rocket firing is missed due to interference by cloud cover there is no harm since such firing is merely postponed until weather conditions and laser rocket positions are again favorable. With a carefully selected laser station site such favorable positioning occurs with relatively high frequency.

Mention was made hereinabove of a laser rocket wherein the radiation reflector has plan projection dimensions of 20 meters square. Such a vehicle can operate with reasonable efficiency with a carbon monoxide laser at a distance up to about 50,000 kilometers from a laser station. A typical vehicle has a propellant capacity of 60,000 kilograms. The empty vehicle mass is about 12,000 kilograms for a maximum vehicle mass of about 72,000 kilograms. With a single 500 megawatt carbon monoxide laser beam originating from the earth's surface, the laser rocket has an effective power of about 460 megawatts and a propellant flow rate of 2.4 kilograms per second. The engine thrust is 10,500 pounds and the engine ISP is about 2,000 seconds. A maximum engine burn time of about 7 hours is obtained. With such characteristics, the laser rocket space tug can boost a 5,000,000 pound payload to the moon. Similarly, it can boost a 2,000,000 pound payload to Venus or Mars, with a hyperbolic excess velocity of about 3.2 kilometers per second. A 150,000 pound payload can be boosted to Jupiter with a hyperbolic excess velocity of about 9.23 kilometers per second. In any of these escape maneuvers the laser rocket is retained in an earth orbit and can be reused.

The thrusting maneuvers required for each of these missions begins from a highly eccentric initial parking orbit. Typically, initial parking orbits for high energy, low mass interplanetary missions have apoapsis and periapsis distances of approximately 350,000 kilometers and 7,000 kilometers, respectively, corresponding to an eccentricity of 0.96. The period of such orbits is 8.7 days. The laser rocket maneuvers the payload into this eccentric orbit from a lower parking orbit by the aforementioned periodic engine burns. The final thrusting injection maneuver into an escape trajectory begins when the vehicle and the payload are approaching the earth at a distance that may be as much as 50,000 kilometers from the laser generating plant. The retropropulsion maneuver for the laser rocket begins immediately after the payload is released and lasts from about 2 to 30 minutes depending on the escape trajectory.

Although limited embodiments of space vehicle powered by an earth based laser station have been described and illustrated herein, many modifications and variations will be apparent to one skilled in the art. It is therefore to be understood that within the scope of the appended claims, the invention may be practiced otherwise than as specifically described.

What is claimed is:

1. A space vehicle comprising:
   a structural frame defining a vehicle axis;
   propellant tank means mounted in the frame adjacent the forward end of the space vehicle for containing a vaporizable propellant;
   a rocket nozzle at the rearward end of the frame and aligned substantially in line with the vehicle center of mass;
   energy gathering assembly means for receiving laser beam radiation;
   means for mounting the energy gathering assembly for pivoting about an axis transverse to the vehicle axis and adjacent an input portion of the rocket nozzle; and
   means for conveying propellant from the tank means to the energy gathering assembly;
   said energy gathering assembly comprising:
   a laser beam reflector in the general form of a parabolic cylinder having its focal axis transverse to the pivot axis of the energy gathering assembly;
   a radiation absorption conduit extending along the focal axis of the radiation reflector;
   means for injecting propellant for flow along the length of the conduit; and
   swivel means for conveying propellant from the end of the conduit to the input portion of the rocket nozzle.

2. A space vehicle as defined in claim 1 further comprising means for rolling the space vehicle for maintaining the pivot axis of the energy gathering assembly in a predetermined orientation.

3. A space vehicle as defined in claim 1 wherein the means for mounting the energy gathering assembly for pivoting comprises a pivot on the structural frame and a guide track between the radiation reflector and the structural frame, said energy gathering assembly further comprising means for counterbalancing the radiation reflector for maintaining the center of mass of the energy gathering assembly substantially on a line between the rocket nozzle and the center of mass of the space vehicle.

4. A space vehicle as defined in claim 1 wherein the energy gathering assembly comprises a conduit for conveying propellant from the pivot axis along the reverse side of the radiation reflector to the input of the radiation absorption conduit; and further comprising means for recirculating a portion of the propellant from the output of the absorption conduit to the input thereof.

5. A space vehicle as defined in claim 1 further comprising means at the forward end of the frame for temporarily latching the space vehicle to a second space vehicle for propulsion thereof.

6. A space vehicle as defined in claim 1 further comprising means for providing access to the propellant tank means for removal and replacement thereof.

7. A space vehicle as defined in claim 1 wherein the radiation absorption conduit comprises a tube substantially completely transparent to radiation of a selected wave length and means for cooling the walls of the tube.

8. A space vehicle as defined in claim 7 wherein the means for injecting propellant further comprises means for injecting refractory particles into a portion of the propellant stream through the tube.

9. A space vehicle as defined in claim 7 wherein the means for cooling the walls of the tube includes a boundary layer of propellant adjacent the interior walls and means for recirculating at least a portion of the boundary layer to the input of the absorption conduit.

10. A method of propelling a space vehicle comprising the steps of
    directing a high energy laser radiation beam from a generating station into space;
    reflectively concentrating the radiation beam on a space vehicle;
    passing a propellant through the concentrated radiation beam for direct absorption of radiation by the propellant, thereby heating the propellant; and
    ejecting the propellant from the space vehicle in a direction for propulsion thereof.

11. A method as defined in claim 10 comprising the additional step of injecting refractory particles in the propellant stream before passing it through the concentrated radiation beam.

12. A method as defined in claim 10 further comprising the step of mixing a resonant energy absorbing vapor with the propellant prior to passing the propellant through the concentrated radiation beam.

13. A method as defined in claim 10 wherein the step of reflectively concentrating comprises pivoting a parabolic cylindrical radiation reflector about a pivot axis normal to a line between the space vehicle and the generating station for maintaining the focal axis of the reflector normal to the line between the space vehicle and the generating station.

* * * * *

8115:RDS

PO-1050
(5/69)

UNITED STATES PATENT OFFICE
CERTIFICATE OF CORRECTION

Patent No. 3,825,211  Dated July 23, 1974

Inventor(s) Michael A. Minovitch

It is certified that error appears in the above-identified patent and that said Letters Patent are hereby corrected as shown below:

On the title page in the Abstract, line 5, "flow" should read -- flows --. Column 3, line 22, "th" should read -- the --. Column 7, line 13, "proellant" should read -- propellant --; Column 7, line 57, delete "rocket" (second occurrence).

Signed and sealed this 5th day of November 1974.

(SEAL)
Attest:

McCOY M. GIBSON JR.
Attesting Officer

C. MARSHALL DANN
Commissioner of Patents